(No Model.)

W. G. GIBBS.
SPRING WHEEL FOR BICYCLES.

No. 587,196. Patented July 27, 1897.

Witnesses:

Inventor:
William George Gibbs

THE NORRIS PETERS CO., PHOTO-LITHO., WASHINGTON, D. C.

UNITED STATES PATENT OFFICE.

WILLIAM GEORGE GIBBS, OF GULGONG, NEW SOUTH WALES.

SPRING-WHEEL FOR BICYCLES.

SPECIFICATION forming part of Letters Patent No. 587,196, dated July 27, 1897.

Application filed April 10, 1897. Serial No. 631,608. (No model.)

*To all whom it may concern:*

Be it known that I, WILLIAM GEORGE GIBBS, miner, a subject of the Queen of the United Kingdom of Great Britain and Ireland, and a resident of Gulgong, in the Colony of New South Wales, have invented certain new and useful Improvements in Spring-Wheels for Bicycles and Other Vehicles, of which the following is a specification.

The object of this invention is to provide improvements in spring-wheels suitable for cycles, autocars, and other vehicles, whereby shocks communicated to the rims of such wheels, as by inequalities of the roadway, will have their force greatly reduced before they reach the frame of the cycle or other vehicle.

This invention is particularly adapted for those vehicles in which the use of pneumatic rubber tires to prevent vibration and bumping is found to be accompanied by undue expense, liability to puncture, or other disadvantage.

As an aid to the understanding of my invention reference is to be had to the accompanying drawings, in which—

Figure 1:
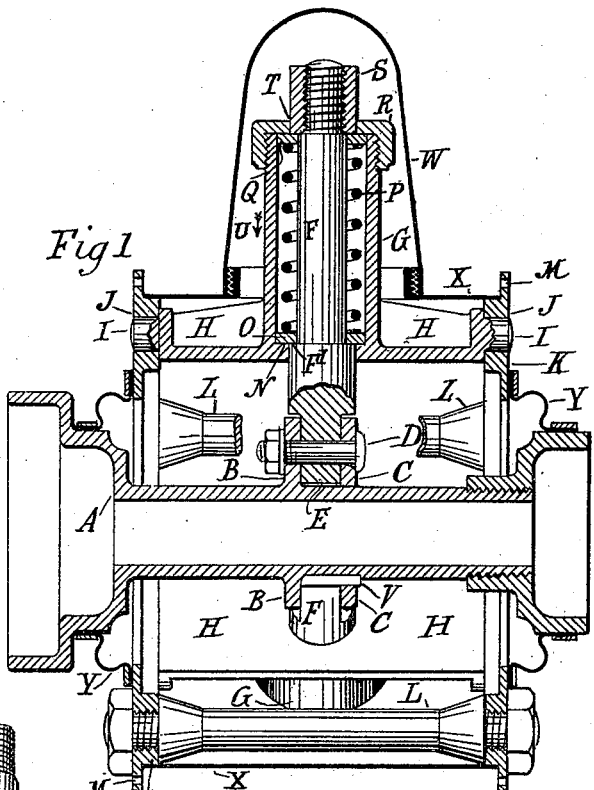
Figure 4:
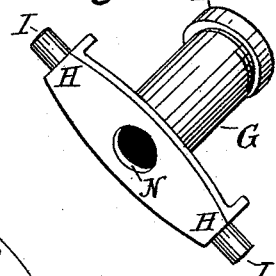
Figure 3:
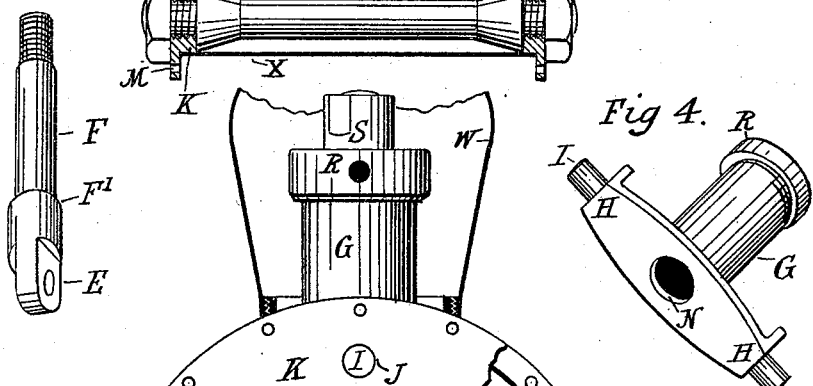
Figure 2:
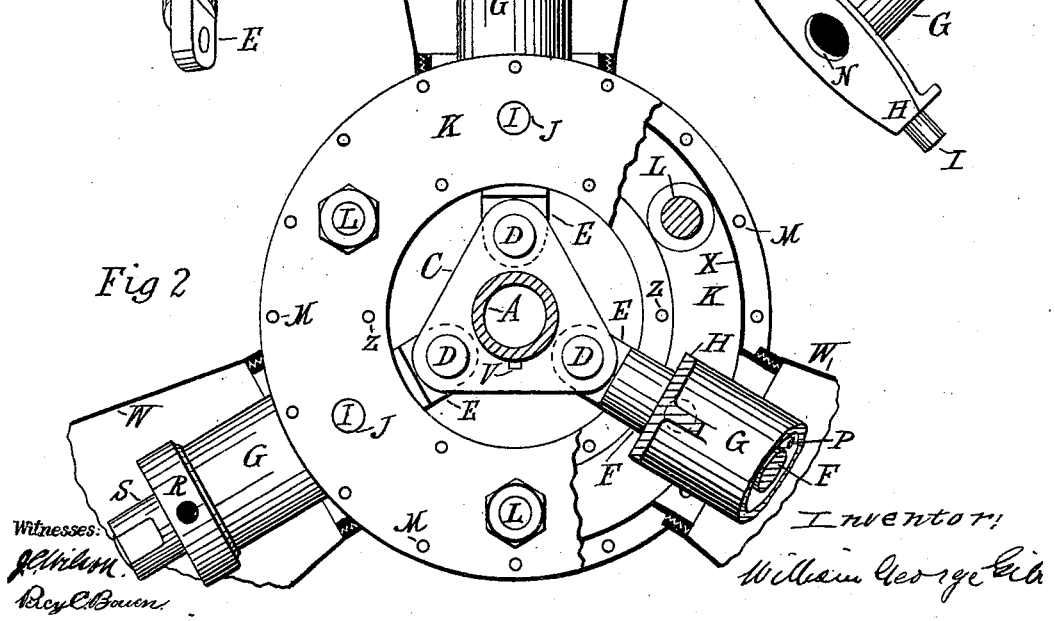

Figure 1 shows a vertical cross-section of a hub of a spring-wheel containing the invention, (the spindle not being shown nor the frame connected thereto.) Fig. 2 is a side elevation showing certain of the parts shown in Fig. 1, with parts broken away to exhibit the interior. Fig. 3 shows a perspective view of one of the spring-pins, and Fig. 4 a perspective view of a spring-pin casing. Figs. 3 and 4 are on a smaller scale than Figs. 1 and 2.

A shows an inner hub through which the spindle passes, said hub having around it, near its center, a fixed flange B and an adjustable flange-plate C. The flanges B and C are perforated with holes, being adapted to receive between and have attached to them, as by bolts D, the perforated inner ends E of any desired number of spring-pins F in such position that the axis of each spring-pin extends radially outward at right angles to the axis of the inner hub, at the middle of the latter.

V shows a feather for adjusting the plate C.

The body of each spring-pin F is inclosed in a casing or cylindrical part G, having at the inner end two transversely-extending trunnions H, the respective ends I of which are journaled in bearings J in rings K, which form the outer hub. The rings K are permanently fastened at a fixed distance apart by the bolts L, and the casings G are, under certain strains, adapted to oscillate slightly on the fulcrums I.

M shows holes in the edge of each outer hub-ring for connection of the spokes of the wheel.

N shows an internal shoulder at the inner end of the interior of the cylinder G.

O is a disk or washer (which must be of rigid material) placed at the inner end of and within each cylinder.

Q is another washer of rigid material at the outer end of and within each cylinder.

P is a spiral spring between the washers O and Q, and R is a cap screwed onto and forming the outer end of the cylinder G. Each spring P is long enough normally to keep the washers pressed against their respective ends N and R of the cylinder G, the opening in each of which ends, being of a smaller diameter than the washers, cannot be passed by the latter. A nut S or other enlargement is arranged upon the outer end of each spring-pin F, said nut snugly filling a hole T in the cap R, while the pin F itself, by reason of a shoulder F', snugly fills the hole at the other end of cylinder G.

By the above arrangement each pin is free to slide longitudinally inwardly as well as outwardly, and when either one (or two) slides (or slide) inwardly the other two (or one) necessarily slide (or slides) outwardly, all three springs being thus compressed together and all assisting to return the pins to their normal positions, as shown in Fig. 1, as soon as possible. If any jolt is given to the rim of the wheel, the shock will be transmitted to the outer hub-rings K, then by the aforesaid trunnions to cylinders G. If the jolt is sufficiently severe, at least one cylinder will be moved inward toward the spindle or axle, and where but one moves inward the other two will move outward. As the former cylinder moves inward—that is, in the direction of arrow U, Fig. 1—it will carry its washer Q with it, compressing its spring, while the other two cylinders will carry their washers O with them, also compressing their springs. The springs will transmit the shock, in a reduced degree, to the opposite washers in each cylinder, and these washers will transmit it to the spring-pins F by reason (as the case may be) of the shoulder F' or the nuts S, each of which is in this action similar in function. Obviously no dust will be able to enter the cylinders, but a cover W over each cylinder and a cylindrical casing X between the outer hub-rings K and elastic or flexible annular covers Y are preferably attached to my device to protect the parts from injury or from harboring dirt. It is necessary to have the covers Y flexible in view of the necessity for avoiding the transmission of shocks from A to K, which Y connects. Z are the holes preferably used to attach covers Y (not shown in Fig. 2) to hub-rings K. This foregoing arrangement of parts has the merit of being very easily and quickly taken to pieces and set up, while delicate or complex parts are not introduced.

Without deviating from the essence of this invention there may be various obvious modifications made. For example, both the flanges B and C may be integral with the inner hub, and there may be more than one series of spring-pins and corresponding parts arranged around the same inner hub.

Having now particularly described my invention, what I claim is—

1. In a yielding hub, the combination with an inner cylinder having a solid encircling flange thereon near its mid-length and a movable ring keyed on said cylinder near said flange; a pair of annular rings surrounding said cylinder; and spacing tie-rods between said pair of rings; of a plurality of radial pins pivoted at their inner ends between said flange and said ring on said cylinder, and each of said pins having a reduced portion screw-threaded at its outer end; a circular nut engaging said screw-threaded portion; a pair of rigid washers surrounding the reduced portion of each of said pins at opposite ends thereof; a coil-spring encircling the reduced portion of each of said pins and bearing upon said washers; a plurality of cylinders trunnioned radially in said pair of rings, and inclosing the reduced portions of said pins and said washers and springs thereon, and each of said cylinders having a reduced open inner end and externally-screw-threaded open outer end, the washers on said pins fitting closely within said cylinders; and a screw-cap upon the outer end of each of said cylinders provided with a central opening inclosing the said circular nut on each of said pins, substantially as described.

2. In a yielding hub, the combination with an inner cylinder having a solid encircling flange thereon near the middle of its length, and a movable ring keyed on said cylinder near said flange; a pair of annular rings surrounding said cylinder, and spacing tie-rods between said pair of rings; of a plurality of radial pins pivoted at one end between said flange and said movable ring on said cylinder; a plurality of cylinders trunnioned in said pair of rings and inclosing a portion of said radial pins; and a coil-spring confined in each of said cylinders and resisting the thrusts of said pins, substantially as described.

3. In a yielding hub, the combination with an inner cylinder, having a plurality of radial pins pivoted thereto at one end and having a reduced portion provided with screw-threads at its outer end; a circular nut engaging said screw-threaded portion; a pair of rigid washers surrounding the reduced portion of each of said pins at opposite ends thereof; a coil-spring encircling the reduced portion of each of said pins and bearing upon said washers; of a pair of annular rings surrounding said inner cylinder; a plurality of cylinders trunnioned radially in said pair of rings, and inclosing the reduced portions of said pins and said washers and springs thereon, and each of said cylinders having a reduced open inner end and externally-screw-threaded open outer end, the washers on said pins fitting closely within said cylinders; and a screw-cap upon the outer end of each of said cylinders provided with a central opening inclosing the said circular nut on each of said pins, substantially as described.

In witness whereof I have hereunto set my hand in the presence of two subscribing witnesses.

WILLIAM GEORGE GIBBS.

Witnesses:
GEORGE G. TURRI,
W. H. CUBLEY.